United States Patent [19]

Powers

[11] Patent Number: 4,830,230

[45] Date of Patent: May 16, 1989

[54] HYDRAULICALLY CONTROLLED PORTIONER APPARATUS

[75] Inventor: Richard G. Powers, Overland Park, Kans.

[73] Assignee: Marlen Research Corporation, Overland Park, Kans.

[21] Appl. No.: 65,045

[22] Filed: Jun. 22, 1987

[51] Int. Cl.$^4$ .................. G01F 11/36; G01F 11/42
[52] U.S. Cl. ........................ 222/334; 91/306; 91/350; 91/281; 417/403
[58] Field of Search .......... 222/334, 249, 250; 91/306, 314, 350, 281, 311; 417/403, 404

[56] References Cited

U.S. PATENT DOCUMENTS

| | | | |
|---|---|---|---|
| Re. 30,096 | 9/1979 | Richards | 17/32 |
| Re. 31,857 | 4/1985 | Holly | 17/45 |
| 3,052,379 | 9/1962 | Raspante | 222/250 |
| 3,108,318 | 10/1963 | Miller et al. | 17/39 |
| 3,422,489 | 1/1969 | Middleton | 17/35 |
| 3,456,285 | 7/1969 | Miller et al. | 17/39 |
| 3,465,686 | 9/1969 | Nugier | 91/306 X |
| 3,871,085 | 3/1975 | Hahn | 17/32 |
| 3,943,601 | 3/1976 | Kuhlman | 17/32 |
| 4,022,269 | 5/1977 | Segawa | 222/334 X |
| 4,050,356 | 9/1977 | Jaggi et al. | 91/306 |
| 4,097,962 | 7/1978 | Alley et al. | 17/39 |
| 4,113,890 | 9/1978 | Long | 426/512 |
| 4,188,767 | 2/1980 | Piereder | 53/122 |
| 4,191,309 | 3/1980 | Alley et al. | 222/1 |
| 4,213,298 | 7/1980 | Milgram | 417/404 X |
| 4,237,581 | 10/1980 | Langen et al. | 17/45 |
| 4,257,145 | 3/1981 | Bovino | 17/32 |
| 4,334,636 | 6/1982 | Paul | 222/334 X |
| 4,479,614 | 10/1984 | Bernard | 241/82.2 |
| 4,516,387 | 5/1985 | Kupcikevicius | 53/530 |
| 4,534,084 | 8/1985 | Stanley | 17/39 |
| 4,557,018 | 12/1985 | Martinek | 17/49 |
| 4,565,054 | 1/1986 | Piereder | 53/517 |
| 4,582,103 | 4/1986 | Piereder | 141/238 |
| 4,637,936 | 1/1987 | White et al. | 426/523 |

Primary Examiner—Joseph J. Rolla
Assistant Examiner—Mona C. Beegle
Attorney, Agent, or Firm—Hovey, Williams, Timmons & Collins

[57] ABSTRACT

An improved portioning assembly adapted for use in the precise portioning of food or other products is provided which makes use of a double-acting piston and cylinder assembly shiftable between defined limits, with the stroke length of the piston being correlated with the quantity of dispensed portions. The preferred overall portioning assembly includes a hydraulically operated product pump coupled with the control piston and cylinder assembly for sequential product-dispensing movement thereof; movement of the control piston between spaced limits serves to actuate associated limit switches, the latter operating a valve for directing pressurized charges of hydraulic fluid to the hydraulic pumping chamber. If desired, a delay can be provided before the initiation of each product-dispensing stroke of the control piston.

10 Claims, 2 Drawing Sheets

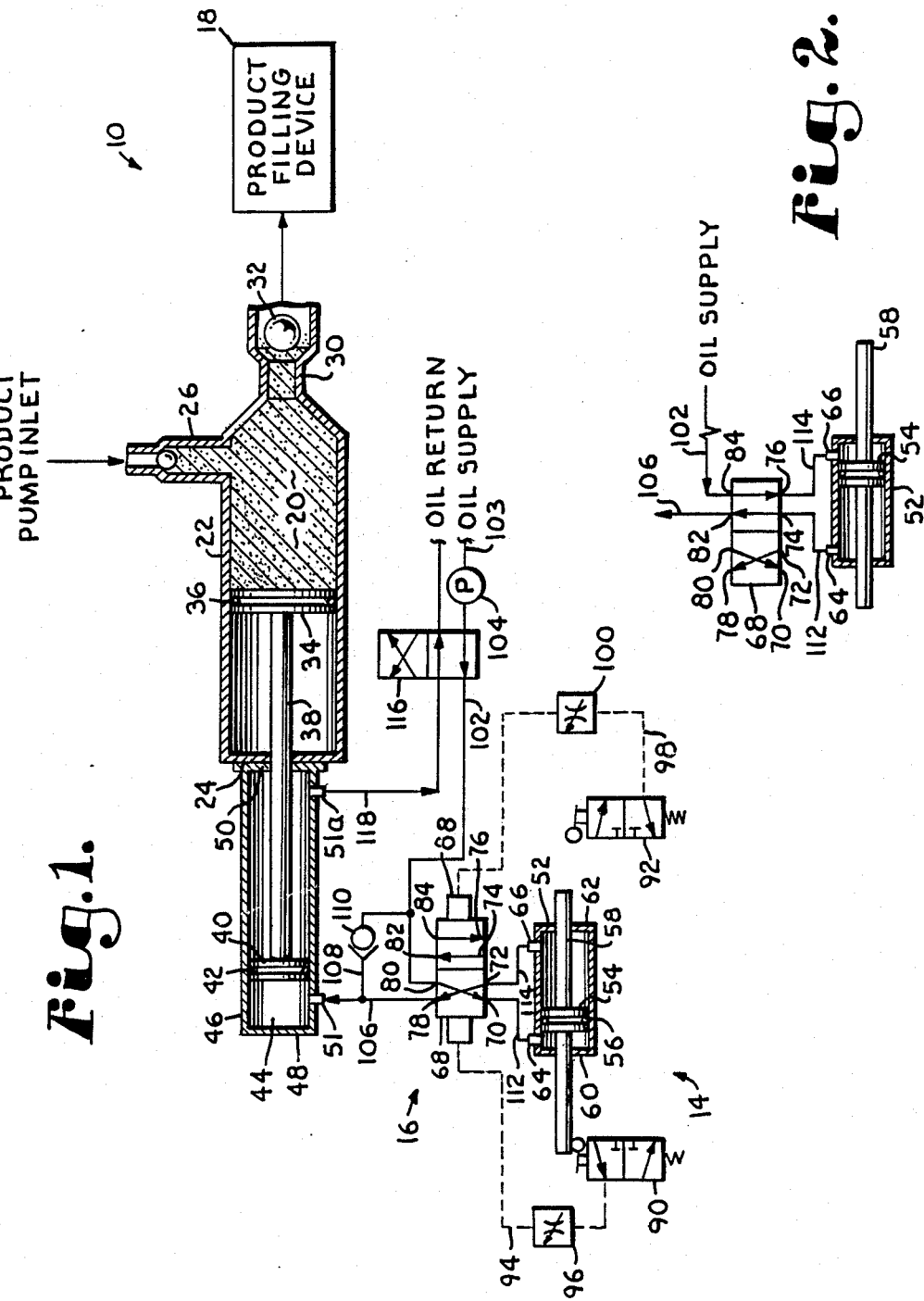

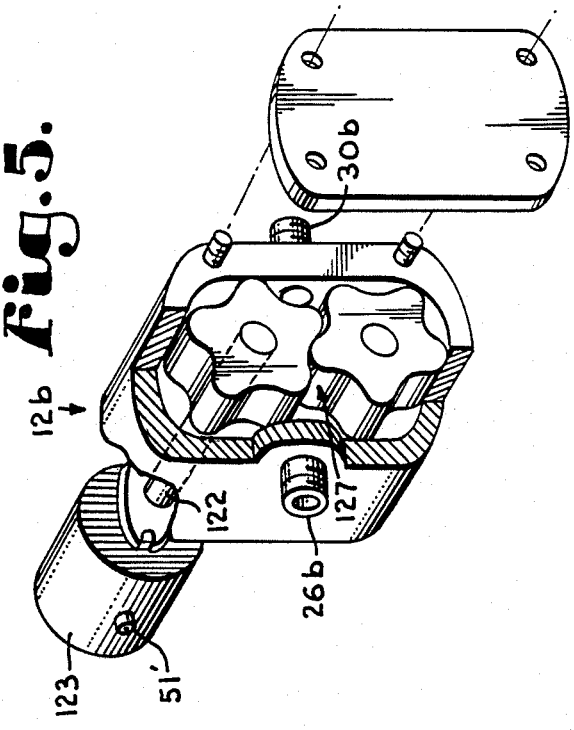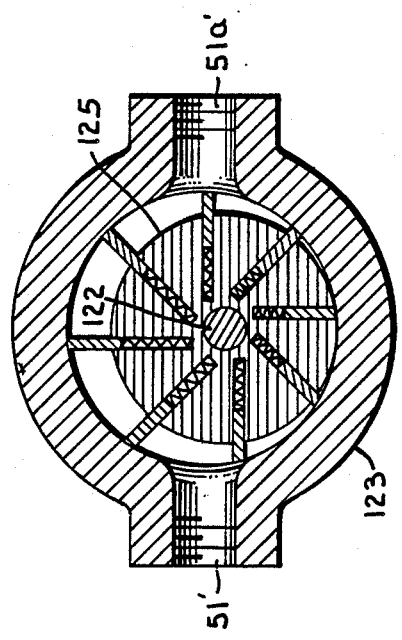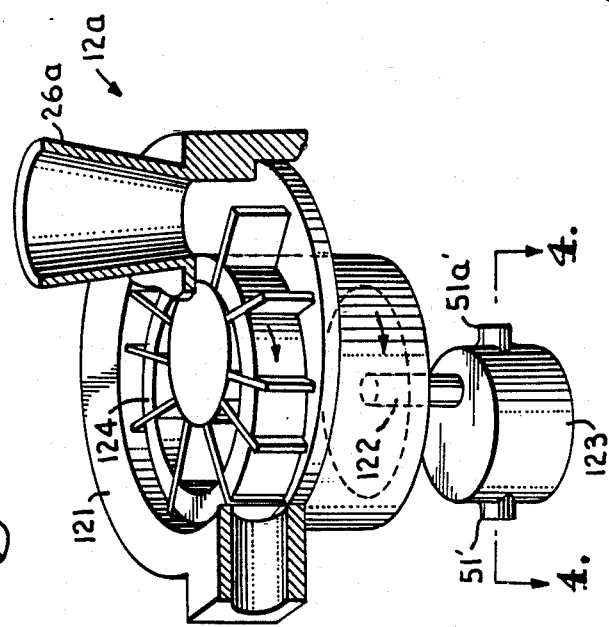

HYDRAULICALLY CONTROLLED PORTIONER APPARATUS

BACKGROUND OF THE INVENTION

1. Field of the Invention

The present invention is broadly concerned with an improved hydraulic portioning assembly designed to facilitate precise portioning of fluid or semi-fluid products such as meat in order to deliver successive portions to the filling or packaging device. More particularly, it is concerned with such a portioning assembly making use of hydraulic control means comprising a double-acting piston and cylinder assembly coupled via valve means with a hydraulically powered product dispensing device such that stroke length of the hydraulic control means controls the portions dispensed.

2. Description of the Prior Art

In the production of meat products such as hamburger or sausage, it is often desirable to deliver precisely metered or portioned quantities to a filling or packaging station. As can be appreciated, if underweight portions are dispensed, the ultimate consumer suffers. By the same token, if portions are overweight, the seller is at a disadvantage. Thus, it is very desirable in automated meat handling operations to provide a portioning assembly which gives precise, repeatable portions.

By the same token, however, modern day automated processing demands a given portioning assembly be adaptable for high speed operation and be extremely reliable in use. These requisites are of course inimical to precision portioning, and thus there has been a real need in the art for a simplified, rugged, yet highly precise portioning assembly useful in conjunction with hydraulic food pumps or similar devices.

SUMMARY OF THE INVENTION

The present invention overcomes the problems noted above, and provides an improved portioning assembly adapted for coupling between a supply of product and a product filling device in order to deliver successive portions of the product to the filling device. The preferred portioning assembly of the invention includes hydraulic product pumping means having structure defining a product chamber, and a product inlet and a product outlet in communication with the chamber. A product dispensing means is shiftably positioned within the product chamber and is selectively shiftable for expelling product from the chamber through the outlet. In practice, hydraulically powered piston-type pumps, rotary vane pumps or lobe pumps can be used to good effect in the invention.

An hydraulic motive means also forms a part of the pumping means and includes an hydraulic chamber, means defining a pair of hydraulic fluid openings communicating with the chamber, a shiftable motive element within the chamber shiftable in response to the delivery of hydraulic fluid through one of the openings, and motive power output means coupled with the motive element and extending out of the chamber.

The pumping means also includes means operably connecting the motive power output means and the product dispensing means for product expelling movement thereof in response to shifting movement of the motive element. In the case of a piston pump for example, the motive means is advantageously in the form of a separate hydraulic chamber having a shiftable piston therein, with a rod interconnecting the pistons in the hydraulic chamber and the main product pumping chamber.

Hydraulic control means also forms a part of the portioning assembly and includes a double-acting piston and cylinder assembly having a control cylinder normally filled with hydraulic fluid, together with a bidirectionally shiftable control piston within the cylinder. The cylinder moreover has a pair of spaced apart hydraulic fluid ports respectively located on opposite sides of the piston and in communication with the interior of the cylinder. Thus, the control piston is bidirectionally shiftable within the cylinder between spaced apart limits by selective application of pressurized hydraulic fluid to the described ports. The control piston therefore shifts within limits which define the stroke length of the control piston.

Finally, the overall portioning assembly includes power means operatively coupled with the hydraulic control means and the hydraulic chamber opening for back-and-forth shifting of the control piston along the stroke length thereof. This serves to generate successive charges of pressurized hydraulic fluid from the control cylinder ports. The overall hydraulic circuitry is further oriented for replenishing the supply of hydraulic fluid within the control cylinder as successive charges are generated. The power means has structure for delivery of the successive charges of pressurized fluid from the control cylinder ports to the hydraulic chamber opening so as to shift the product dispensing means a distance correlated with the stroke length of the control piston. In this fashion, successive portions of the product are delivered from the outlet of the product chamber to a filling or packaging device.

In particularly preferred forms, the power means comprises a four-way shiftable valve having a pair of actuating pilots. First and second hydraulic fluid conduits are provided which are respectively coupled between each of the ports of the control cylinder and the valve. Additionally, a third hydraulic fluid conduit is coupled between the valve and the hydraulic chamber opening. The valve is shiftable by virtue of actuation of the noted pilots between a position where one of the control cylinder ports is operatively connected with the hydraulic chamber opening, and a position wherein the other of the control cylinder ports is connected with the opening.

Advantageously, the pilot valve is associated with a pair of external, air actuated limit switches which define the limits of the control piston. Each of the air-operated limit switches is in turn operatively coupled with an associated pilot so as to properly position the four-way valve during operation of the portioning assembly.

BRIEF DESCRIPTION OF THE DRAWINGS

FIG. 1 is a schematic depiction of a portioning assembly in accordance with the invention, feeding a conventional product filling device, and with the hydraulic control means of the portioning assembly being oriented in one of the positions thereof;

FIG. 2 is a schematic, fragmentary view illustrating important components of the hydraulic control means illustrated in FIG. 1 in the second operational position thereof;

FIG. 3 is a schematic depiction of an alternative pumping means shown in perspective with portions cut away for clarity;

FIG. 4 is a plan sectional view of the conventional hydraulic motor along line 4—4 of FIG. 3; and FIG. 5 is a schematic depiction of another alternative pumping means shown in perspective with portions cut away and broken away for clarity.

DESCRIPTION OF THE PREFERRED EMBODIMENT

Turning now to the drawing, a portioning assembly 10 is illustrated in FIG. 1. Broadly speaking, the assembly 10 includes a hydraulic product pumping means 12, hydraulic control means 14, and power means 16 operatively coupled between the pumping means 12 and control means 14. The entire assembly 10 is designed to deliver successive portions of product to a product filling or packaging device 18 situated adjacent the outlet of pumping means 12. The device 18 may be any of a variety of known filling or packaging units, such as a horn stuffer used for the filling of sausage-type products into casings.

In more detail, the pumping means 12 is in the form of a hydraulic pump typically used to dispense fluid or semi-fluid products such as meat. Although the pumping assembly is illustrated in schematic form for ease of understanding, it should be understood that any one of a number of hydraulically operated pumps can be used to good effect in the invention. To give but one example, the twin piston food pumps commercialized by Marlen Research Corporation of Overland Park, Kans. can be used to good effect in the invention. Such pumping units are well known and are described in U.S. Pat. No. 4,097,962 which is expressly incorporated by reference herein. Other pumping means 12 are illustrated in FIGS. 3-5 which will be discussed in greater detail hereinafter.

In any event, it will be observed that the pumping means 12 of FIG. 1 includes an elongated product chamber 20 defined by a circular-in-cross-section sidewall 22 and apertured end wall 24. The chamber-defining sidewall 22 is further provided with a product inlet 26 having a schematically illustrated valving unit 28 associated therewith, and a product outlet 30 likewise having a selectively actuatable valve assembly 32 as a part thereof.

A product dispensing piston 34 is slidably positioned within chamber 20 and is shiftable in a forward direction towards outlet 30 and, in addition, in a rearward direction in order to permit filling of the chamber 20 with product as will be explained. The piston 34 is provided with the usual peripheral sealing means 36 engaging the inner surface 22. Further, an elongated piston rod 38 is affixed to piston 34 and extends rearwardly therefrom in a direction remote from product outlet 30. It will be observed in this respect that the piston rod 38 extends through a central aperture provided in wall 24 to a point exteriorly of the chamber 20.

A hydraulic piston 40 is coupled to the rearward end of rod 38 as shown, with the piston 40 likewise being provided with peripheral seal 42.

The overall pump 12 also includes a hydraulic chamber 44 defined by a tubular sidewall 46, rearmost end wall 48, and forward end wall 50 which is apertured for slidably clearing piston rod 38. The chamber-defining sidewall 46 is provided with a pair of spaced apart hydraulic fluid openings 51, 51a, which are respectively oriented adjacent corresponding end walls 48, 50, and on opposite sides of piston 40.

The hydraulic control assembly 14 includes a double-acting piston and cylinder assembly in the form of an elongated hydraulic cylinder 52 having an internal, bidirectionally shiftable control piston 54 therein. Control piston 54 includes a peripheral cylinder-engaging seal 56, together with an elongated piston rod 58 which extends in both directions from piston 54 and through the opposed, apertured end walls 60, 62 forming a part of the hydraulic cylinder. A pair of hydraulic fluid ports 64 66 are located adjacent the corresponding end walls 60, 62 and on opposite sides of piston 54.

The power means 16 is preferably in the form of a four-way pilot actuated hydraulic valve 68 having four fluid passageways therethrough presenting a total of four first end openings 70-76, and four corresponding second end openings 88-84. Further, the valve 68 is provided with a pair of actuating pilots 86, 88, the importance of which will be described.

A pair of compressed air-actuated limit switches 90, 92 are respectively located on either side of control cylinder 52 and oriented for engagement by the respective associated ends of piston rod 58. A pneumatic line 94 is coupled between switch 90 and pilot 86 as illustrated, and has a conventional, variable orifice delay device 96 interposed therein. In like manner, a pneumatic line 98 is operatively coupled between switch 92 and pilot 88, and has a variable orifice delay device 100 interposed therein.

The overall hydraulic system forming a part of assembly 10 includes the usual supply of hydraulic oil by way of hydraulic lines 102, 103 from the supply to valve 68, and in particular to either second end opening 80 or 84, depending upon the position of the valve. A pump 104 is interposed in line 103 as indicated to give a pressurized fluid source. A second hydraulic line 106 is coupled between valve 68 and opening 51 of chamber 44, with the connection to valve 68 being either at second end opening 78 or 82, depending upon the valve position. A branch line 108, provided with a check valve 110 interposed therein, extends between and is coupled to lines 106 and 102 as illustrated.

A pair of hydraulic fluid conduits 112, 114 are coupled between cylinder 52 and valve 68. Specifically, the conduit 112 is connected between port 64 and either first end opening 70 or 74 of the valve, depending upon its position. In like manner, conduit 114 is connected between port 66 and either first end opening 72 or 76 of valve 68.

The hydraulic system for assembly 10 is completed by provision of a selectively shiftable four-way valve 116, together with a return conduit 118 leading from opening 51a to the oil supply. It will be observed in this respect that conventional four-way valve 116 is interposed within the line 118 and coupled between lines 102, 003 for purposes to be described.

With particular reference to FIG. 1, it will be seen that control piston 54 is shifted leftwardly within cylinder 52 to one of its limits, i.e., that defined, by the engagement between the leftmost end of rod 58 and limit switch 90, and is just beginning its rightward movement. In the depicted condition of the assembly 10, limit switch 90 has been activated, sending a pulse of operational air to pilot 86, thereby serving to shift valve 68 rightwardly. In this orientation, conduit 112 is coupled to first end opening 70, whereas conduit 114 is connected to first end opening 72. Similarly, line 102 is coupled to second end opening 80, whereas line 106 is coupled with second end opening 78.

Operation of pump 104 serves to propel pressurized hydraulic fluid through line 102, valve 68, conduit 112 and port 64 into the interior of chamber 52. This serves to move piston 54 rightwardly as viewed in FIG. 1, and this in turn sends a charge of pressurized hydraulic fluid through port 66, conduit 114, valve 68, line 106 and opening 51 into the interior of chamber 44. This moves hydraulic piston 40 rightwardly, with the result the a similar movement is imparted to product-dispensing piston 34. As the latter moves rightwardly valve 32 is opened and product is discharged to the device 18. When piston 54 reaches its rightmost limit, the righthand end of rod 58 engages limit switch 92. This serves to actuate pilot 88 to shift valve 68 to its lefthand position as viewed in FIG. 2. In this orientation, conduit 112 is coupled between port 64 and first end opening 74, with conduit 114 communicating port 66 an first end opening 76. Similarly, line 102 is coupled with second end opening 84, with line 106 being connected to second end opening 82.

In the FIG. 2 orientation, the above-described procedure is reversed, i.e., pressurized hydraulic fluid, in line 102 passes through valve 68, conduit 114 and port 66 in order to move piston 54 leftwardly. This in turn sends a charge of hydraulic fluid from cylinder 52 through port 64, conduit 112, valve 68, line 106 and opening 51 in order to again move both hydraulic piston 40 and product-dispensing piston 34 rightwardly to discharge a portion of product to device 18.

It will therefore be seen that during operation of assembly 10 as illustrated in FIGS. 1 and 2, the control piston 54 reciprocates within cylinder 52 between the limits established by the switches 90, 92. This creates successive forward movements of piston 34 in order to dispense accurate portions of product to device 18. Those skilled in the art will appreciate that the delay elements 96, 100 respectively interposed within pneumatic lines 94, 98 can be set to provide a pause between each stroke of the control piston, thereby enabling operations at device 18. For example, if a sausage-type product is being dispensed to a conventional horn stuffer, such a timed pause would enable placement of a fresh sausage casing at the horns of the filling device.

When piston 34 reaches the end of its forward stroke after having dispensed a plurality of portions to device 18, it is of course necessary to refill chamber 20 with product. This is accomplished by shifting valve 116 to its downward position such that pressurized fluid from line 103 is directed through line 118 to opening 51a; also, line 102 is coupled with the oil return line. When the valve 116 has been so positioned, pressurized hydraulic fluid passes from pump 104 through valve 116, line 118 and opening 51a into chamber 44. This serves to move hydraulic piston 40 leftwardly, which has a similar effect on piston 34 within chamber 20. Hydraulic fluid is exhausted from chamber 44 during this operation through opening 51, line 106, line 108 and check valve 110, line 102, valve 116 and thence back to the oil supply through the return line. Also, as the piston 34 is being retracted leftwardly (or after it has come to a stop in a fully retracted position), a fresh supply of product passes through inlet 26 into chamber 20. At this point the assembly is ready to again deliver portions of product to device 18, and valve 116 is shifted back to its FIG. 1 position. Continued operation of the assembly is carried out as described above.

It will be appreciated that, as hydraulic fluid is exhausting from opening 51 and into line 106, a portion of the hydraulic fluid will also pass through valve 68 and into control cylinder 52. Depending upon the position of valve 68, the hydraulic fluid will shift control piston 54 leftwardly or rightwardly until piston 54 reaches the end of its travel at which point all of the exhausting fluid will then pass through check valve 110.

In the case of the preferred Marlen twin piston pump particularly useful in the context of the present invention, it will be appreciated that the pump inlet 26 is in the form of a hopper which feeds a main product piston chamber. Each product-dispensing piston is in turn provided with a shiftable sleeve which can be alternately opened and closed for product filling purposes. Moreover, the outlet valve associated with a Marlen pump is typically in the form of a bidirectionally shiftable flapper valve respectively communicating each of the juxtaposed piston and sleeve assemblies with a product filling device. It will thus be appreciated that the inlet 26 and its associated valve 28, and outlet 30 and its associated valve 32, are depicted only schematically in the drawing.

FIGS. 3-5 illustrate alternative pumping means which can be advantageously employed in the context of the present invention by replacing pumping means 12 as depicted in FIG. 1. Those skilled in the art will appreciate that the present invention contemplates a wide variety of additional pumping means other than those illustrated.

FIG. 3 depicts alternative pumping means 12a including a conventional rotary vane meat portioner 121 such as a HANDTMAN stuffer coupled by means of shaft 122 to a conventional spring-biased, rotary-vaned hydraulic motor 123.

Portioner 121 includes product inlet 26a, product outlet 30a and vane assembly 124 by means of which product is delivered from inlet 26a to outlet 30a - during rotation of assembly 124 caused by rotation of shaft 122 which is coupled to assembly 124.

Hydraulic motor 123 includes hydraulic fluid inlet 51' and hydraulic fluid outlet 51a' which are functionally analogous to openings 51 and 51a of pumping means 12 depicted in FIG. 1. Hydraulic motor 123 also includes spring biased vaned rotor assembly 125 (FIG. 4) which is coupled with and imparts clockwise movement to shaft 122 as hydraulic fluid passes through motor 123 by way of openings 51' and 51a'.

In use, pumping means 12a replaces pumping means 12 as illustrated in FIG. 1 such that hydraulic line 106 is coupled with opening 51' for delivery of fluid to motor 123 and hydraulic line 118 is coupled with opening 51a' for receiving exhaust fluid therefrom. In operation, one full leftward or rightward stroke of control piston 54 delivers a predetermined fixed amount of hydraulic fluid to motor 123 which in turn causes shaft 122 to rotate by an analogous, predetermined, fixed amount. This in turn causes portioner 121 to deliver a predetermined fixed portion of product through product outlet 30a.

Those skilled in the art will appreciate that with the provision of motor 123, a reversal of hydraulic fluid flow is not needed as in the case of piston-type pumping means 12. Thus, check valve 110 and supply valve 116 are not used. Valves 110 and 116 can be left in the hydraulic circuit, however, in case they are needed as they do not interfere with the operation of motor 123.

FIG. 5 illustrates a second alternative pumping means 12b which also uses hydraulic motor 123 as discussed above and which is coupled by way of shaft 122 to a conventional rotary lobe gear pump 126. Gear pump 126 includes product inlet 26b product outlet 30b, and lobed pumping assembly 127. Rotary lobe gear pumps of the type depicted in FIG. 5 are conventional and are sold under the names A.P.V. CREPACO, WAUKESHA and TRI-CLOVER LADDISH.

In use, power means 12b replaces power means 12 as depicted in FIG. 1 in an analogous manner as discussed in connection with power means 12a so that motor 123 is coupled with hydraulic lines 106 and 118. The passage of a predetermined fixed charge of hydraulic fluid through motor 123 causes corresponding rotation of shaft 122 which in turn causes the lobes of pumping assembly 127 to deliver a predetermined fixed portion of product from product outlet 30b.

I claim:

1. A portioning assembly adapted for coupling between a supply of product and a product filling device in order to deliver successive portions of the product to the filling device, said portioning assembly comprising:

hydraulic product pumping means including structure defining a product chamber, and a product inlet and a product outlet in communication with said chamber;

product dispensing means shiftably positioned within said product chamber and selectively shiftable therein for expelling product from said product chamber through said outlet;

hydraulic motive means including a hydraulic chamber, means defining a pair of hydraulic fluid openings in communication with said hydraulic chamber, a shiftable motive element within said hydraulic chamber and shiftable in response to the delivery of pressurized hydraulic fluid to one of said openings, and motive power output means operably coupled with said motive element and extending out of said hydraulic chamber;

means operably connecting said output means and said product dispensing means for product expelling movement of the product dispensing means in response to said shifting movement of said motive element;

hydraulic control means including double-acting piston and cylinder means having a control cylinder normally filled with hydraulic fluid, a bidirectionally shiftable control piston within said control cylinder, and a pair of spaced-apart, hydraulic fluid ports respectively located on opposite sides of said piston and in communication with the interior of said control cylinder, said control piston being bidirectionally shiftable within said control cylinder between spaced apart limits defining the stroke length of the control piston; and power means operatively coupled with said hydraulic control means and said openings for back and forth shifting of said control piston along said stroke length between said limits in order to generate successive charges of pressurized hydraulic fluid from said ports, there being means for replenishing the supply of hydraulic fluid within said cylinder as said successive charges are generated, said power means further including structure for delivery of said successive charges from said ports to said one opening for said shifting of said product dispensing means a distance correlated with said stroke length, whereby said successive portions are delivered from said outlet to said filling device.

2. The portioning assembly of claim 1, said power means comprising a four-way, pilot actuated valve having a pair of actuating pilots, there being first and second hydraulic fluid conduits respectively coupled between each of said ports and said valve, and a third hydraulic fluid conduit coupled between said valve an one of said openings said valve being shiftable by virtue of actuation of said pilots between a position wherein one of said ports is operatively connected with said opening, and a position wherein the other of said ports is operatively connected with said one opening.

3. The portioning assembly of claim 2, said power means further including a pair of limit switches each defining a limit for said control piston and each being operatively coupled with an associated pilot, there being means for operatively engaging each switch when the control piston reaches the associated limit, said switches being operable upon actuation thereof for engaging the pilot actuator coupled therewith to thereby change the position of said valve.

4. The portioning assembly of claim 1, said power means including delay means for causing said control piston to remain stationary for a predetermined period of time when the piston reaches each of said limits.

5. The portioning assembly of claim 4 said power means including shiftable valve means for selectively and alternately connecting each of said ports with one of said openings, said delay means comprising means coupled with said valve means for delaying shifting thereof for said predetermined period of time.

6. The portioning assembly of claim 1, said product chamber comprising an elongated body with said outlet at one end thereof and said inlet located along the axial length of the body.

7. The portioning assembly of claim 1, said product dispensing means including a product piston shiftable toward said product outlet for expelling product therethrough, said hydraulic chamber comprising an elongated hydraulic body with said hydraulic fluid openings located along the axial length of said hydraulic body and respectively disposed adjacent opposite ends thereof, said motive element including an axially shiftable hydraulic piston, said motive power output means including a piston rod having one end connected to said hydraulic piston and having a second end extending outwardly from said hydraulic chamber, said connecting means including means connecting said second end of said hydraulic piston to said product piston.

8. The portioning assembly of claim 1, said hydraulic motive means comprising an hydraulic motor, said motive element including a rotatably shiftable spring-biased vaned rotor assembly included as a part of said hydraulic motor in which hydraulic fluid passing therethrough by way of said fluid openings imparts rotational movement to said rotor assembly, said output means including a rotatable shaft having one end coupled to said rotor assembly for rotation thereby and having a second end extending out of said hydraulic chamber.

9. The portioning assembly of claim 8, said product dispensing means including a rotatably shiftable vane assembly positioned within said product chamber for expelling product therefrom through said product outlet during rotation of said vane assembly, said connecting means connecting said second end of said shaft with said vane assembly for rotation thereof during rotation of said shaft.

10. The portioning assembly of claim 8, said product dispensing means including a rotatable lobed pumping assembly positioned within said product chamber for expelling product therefrom through said product outlet during rotation of said pumping assembly, said connecting means including means connecting said second end of said shaft with said pumping assembly for rotation thereof during rotation of said shaft.

* * * * *